(12) United States Patent
Li et al.

(10) Patent No.: US 11,704,504 B2
(45) Date of Patent: Jul. 18, 2023

(54) INTERACTIVE MACHINE TRANSLATION METHOD, ELECTRONIC DEVICE, AND COMPUTER-READABLE STORAGE MEDIUM

(71) Applicant: Beijing Bytedance Network Technology Co., Ltd., Beijing (CN)

(72) Inventors: Lei Li, Beijing (CN); Mingxuan Wang, Beijing (CN); Hao Zhou, Beijing (CN); Zewei Sun, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 108 days.

(21) Appl. No.: 17/176,775

(22) Filed: Feb. 16, 2021

(65) Prior Publication Data
US 2021/0256226 A1  Aug. 19, 2021

(30) Foreign Application Priority Data
Feb. 18, 2020  (CN) .......................... 202010099491.5

(51) Int. Cl.
*G06F 40/56* (2020.01)
*G06F 40/53* (2020.01)
(Continued)

(52) U.S. Cl.
CPC .............. *G06F 40/56* (2020.01); *G06F 40/51* (2020.01); *G06F 40/53* (2020.01); *G06F 40/58* (2020.01)

(58) Field of Classification Search
CPC ...................................................... G06F 40/47
See application file for complete search history.

(56) References Cited

U.S. PATENT DOCUMENTS

| | | | |
|---|---|---|---|
| 2003/0105621 A1* | 6/2003 | Mercier | G06F 40/47 704/2 |
| 2009/0063128 A1* | 3/2009 | Seo | G06F 40/56 704/4 |

(Continued)

FOREIGN PATENT DOCUMENTS

| | | |
|---|---|---|
| CN | 104462072 A | 3/2015 |
| CN | 104679737 A | 6/2015 |

(Continued)

OTHER PUBLICATIONS

Shanbo Cheng, Shujian Huang, Huadong Chen, Xin-Yu Dai, and Jiajun Chen. 2016. PRIMT: A Pick-Revise Framework for Interactive Machine Translation. In Proceedings of the 2016 Conference of the North American Chapter of the Association for Computational Linguistics: Human Language Technologies (Year: 2016).*

(Continued)

*Primary Examiner* — Richemond Dorvil
*Assistant Examiner* — Alexander G Marlow

(57) ABSTRACT

Provided are an interactive machine translation method and apparatus, a device, and a medium. The method includes: acquiring a source statement input by a user; translating the source statement into a first target statement; determining whether the user adjusts a first vocabulary in the first target statement; and in response to determining that the user adjusts the first vocabulary in the first target statement, acquiring a second vocabulary for replacing the first vocabulary, and adjusting, based on the second vocabulary, a vocabulary sequence located in a front of the first vocabulary and a vocabulary sequence located behind the first vocabulary in the first target statement to generate a second target statement.

12 Claims, 8 Drawing Sheets

(51) Int. Cl.
  *G06F 40/51* (2020.01)
  *G06F 40/58* (2020.01)

(56) References Cited

U.S. PATENT DOCUMENTS

| | | | | |
|---|---|---|---|---|
| 2009/0076792 | A1* | 3/2009 | Lawson-Tancred | G06F 40/106 704/2 |
| 2012/0022852 | A1* | 1/2012 | Tregaskis | G06F 40/47 704/E11.001 |
| 2018/0011842 | A1* | 1/2018 | Waibel | G10L 15/06 |
| 2019/0012314 | A1* | 1/2019 | Kim | G06F 40/47 |

FOREIGN PATENT DOCUMENTS

| | | |
|---|---|---|
| CN | 104714943 A | 6/2015 |
| CN | 106407188 A | 2/2017 |
| CN | 109582977 A | 4/2019 |
| CN | 109858045 A | 6/2019 |
| CN | 109918685 A | 6/2019 |

OTHER PUBLICATIONS

Sergio Barrachina, Oliver Bender, Francisco Casacuberta, Jorge Civera, Elsa Cubel, Shahram Khadivi, Antonio Lagarda, Hermann Ney, Jesús Tomás, Enrique Vidal, and Juan-Miguel Vilar. 2009. Statistical Approaches to Computer-Assisted Translation. Computational Linguistics, 35(1):3-28. (Year: 2009).*

Spence Green, Sida I. Wang, Jason Chuang, Jeffrey Heer, Sebastian Schuster, and Christopher D. Manning. 2014. Human Effort and Machine Learnability in Computer Aided Translation. In Proceedings of the 2014 Conference on Empirical Methods in Natural Language Processing (EMNLP) (Year: 2014).*

Álvaro Peris, Luis Cebrián, Francisco Casacuberta "Online Learning for Neural Machine Translation Post-editing" arXiv:1706.03196 (Year: 2017).*

Rongxiang Weng, Hao Zhou, Shujian Huang, Lei Li, Yifan Xia, Jiajun Chen. "Correct-and-Memorize: Learning to Translate from Interactive Revisions". arXiv:1907.03468 (Year: 2019).*

Álvaro Peris, Francisco Casacuberta. "Active Learning for Interactive Neural Machine Translation of Data Streams". arXiv: 1807.11243v2 (Year: 2018).*

Alvaro Peris, Miguel Domingo, Francisco Casacub. "Interactive neural machine translation" Pattern Recognition and Human Language Technology Research Center, Universitat Politecnica de Valencia, Camino de Vera s/n, 46022 Valencia, Spain (Year: 2016).*

Jesús González-Rubio, Daniel Ortiz-Martínez, Francisco Casacuberta, and José Miguel Benedi Ruiz. 2016. Beyond Prefix-Based Interactive Translation Prediction. In Proceedings of The 20th SIGNLL Conference on Computational Natural Language Learning, pp. 198-207, Berlin, Germany. (Year: 2016).*

First Search Report dated Feb. 28, 2023 in CN Appl. No. 2020100994915, English translation (8 pages).

Office Action dated Mar. 8, 2023 in CN Appl. No. 2020100994915, English translation (22 pages).

Weng, R., et al. "Correct-and-Memorize: Learning to Translate from Interactive Revisions," National Key Laboratory for Novel Software Technology, Nanjing, China, Aug. 2019 (9 pages).

Cheng, S., et al., "PRIMT: A Pick-Revise Framework for Interactive Machine Translation", State Key Laboratory for Novel Software Technology, Jun. 12-17, 2016 (11 pages).

* cited by examiner

INTERACTIVE MACHINE TRANSLATION METHOD, ELECTRONIC DEVICE, AND COMPUTER-READABLE STORAGE MEDIUM

CROSS-REFERENCE TO RELATED APPLICATION(S)

This application claims priority to Chinese Patent Application No. 202010099491.5 filed Feb. 18, 2020, the disclosure of which is incorporated herein by reference in its entirety.

TECHNICAL FIELD

Embodiments of the present disclosure relate to the technical field of machine translation and in particular, to an interactive machine translation method and apparatus, a device, and a medium.

BACKGROUND

The machine translation mostly employs a sequence-to-sequence (seq2seq) model to translate a text from one language into another language. The seq2seq model consists of two parts, namely an encoder and a decoder. The encoder and the decoder may each be implemented using a neural network. The workflow of the seq2seq model is as follows: a source statement is sliced into word sequences and input into the encoder, the encoder outputs vectors of a hidden layer, and one target vocabulary may be generated at each time point with the vectors of the hidden layer serving as an input to the decoder, where the one target vocabulary is generated based on the hidden layer and a target vocabulary previously outputted. Finally, a sequence of target vocabularies constitutes a target statement of the machine translation.

The machine translation model has so far been less accurate than manual translation, so target statements obtained through the machine translation often need to be manually adjusted. In general, there are often multiple errors in the translation results, so that the user may need to make several or even numerous corrections to achieve accurate translation.

SUMMARY

In view of the above, embodiments of the present disclosure provide an interactive machine translation method and apparatus, an electronic device, and a storage medium to reduce the times of manual interventions and thus improve the translation quality and translation efficiency.

In a first aspect, an embodiment of the present disclosure provides an interactive machine translation method. The method includes: acquiring a source statement input by a user; translating the source statement into a first target statement; determining whether the user adjusts a first vocabulary in the first target statement; in response to determining that the user adjusts the first vocabulary in the first target statement, acquiring a second vocabulary for replacing the first vocabulary; and adjusting, based on the second vocabulary, a vocabulary sequence located in the front of the first vocabulary and a vocabulary sequence located behind the first vocabulary in the first target statement to generate a second target statement.

In a second aspect, an embodiment of the present disclosure provides an interactive machine translation apparatus. The apparatus includes a source statement acquisition unit, a statement translation unit, an adjustment determination unit and an adjustment response unit. The source statement acquisition unit is configured to acquire a source statement input by a user. The statement translation unit is configured to translate the source statement into a first target statement. The adjustment determination unit is configured to determine whether the user adjusts a first vocabulary in the first target statement. The adjustment response unit is configured to, in response to determining that the user adjusts the first vocabulary in the first target statement, acquire a second vocabulary for replacing the first vocabulary, and based on the second vocabulary, adjust a vocabulary sequence located in the front of the first vocabulary and a vocabulary sequence located behind the first vocabulary in the first target statement to generate a second target statement.

In a third aspect, an embodiment of the present disclosure provides an electronic device. The electronic device includes at least one processor and a memory. The memory is configured to store an executable instruction which, when executed by the at least one processor, causes the electronic device to perform the method described in the first aspect.

In a fourth aspect, an embodiment of the present disclosure provides a computer-readable storage medium. The computer-readable storage medium has a computer program stored thereon, where the computer program, when executed by a processor, implements the method described in the first aspect.

According to the embodiments of the present disclosure, a source statement input by a user is acquired and then translated into a first target statement, if it is determined that the user adjusts a first vocabulary in the first target statement, in response to this adjustment operation, a second vocabulary for replacing the first vocabulary is acquired, and a vocabulary sequence located in the front of the first vocabulary and a vocabulary sequence located behind the first vocabulary in the first target statement are adjusted based on the second vocabulary to generate a second target statement. According to the interactive machine translation method provided by the present disclosure, the user can modify the most obvious error occurring at any position in a translation result, and then a translation result in front of the error position and a translation result behind the error position can be adaptively adjusted based on the modification of the user so that the operation frequency of active error correction of the user is reduced, the interaction efficiency can be significantly improved, and the accuracy of the translation result can be improved.

The Summary is provided to introduce an identification of concepts in a simplified form that are further described in the Detailed Description below. The summary is not intended to identify key features or essential features of the schemes sought to be protected, nor is it intended to be used to limit the scope of the schemes sought to be protected.

BRIEF DESCRIPTION OF DRAWINGS

The above and other features, advantages, and aspects of the embodiments of the present disclosure will become more apparent with reference to the following implementations described below in conjunction with the drawings. Same or similar reference numerals in the drawings denote the same or similar components.

FIG. 3 is a schematic diagram of a graphical user interface embodying an interactive process according to an embodiment of the present disclosure;

FIG. 4 is a schematic diagram of a graphical user interface embodying an interactive process according to an embodiment of the present disclosure;

FIG. 5 is a schematic diagram of a graphical user interface embodying an interactive process according to an embodiment of the present disclosure;

DETAILED DESCRIPTION

To make adopted schemes and achieved effects of the embodiments of the present disclosure clearer, the schemes in the embodiments of the present disclosure will be further described in detail in conjunction with the drawings. Apparently, the embodiments described below are part, not all, of embodiments of the present disclosure. All the other embodiments obtained by those skilled in the art based on the embodiments of the present disclosure without creative labor belong to the scope of the present disclosure.

It is to be noted that the terms "system" and "network" are often used interchangeably in the embodiments of the present disclosure. The term "and/or" used in the embodiments of the present disclosure includes any or all combinations of one or more associated listed items. The terms "first", "second" and the like in the specification, claims, and drawings of the present discourse are used for distinguishing between different objects and not necessarily for describing a particular order.

It is to be further noted that each of the embodiments of the present disclosure may be implemented separately or combined with any other embodiment including any combination of embodiments, which is not limited in the embodiments of the present disclosure.

The names of messages or information exchanged between multiple apparatuses in the embodiments of the present disclosure are for illustrative only and are not intended to limit the scope of such messages or information.

Schemes of the embodiments of the present disclosure are further described below through implementations in conjunction with the drawings.

Figure 1:
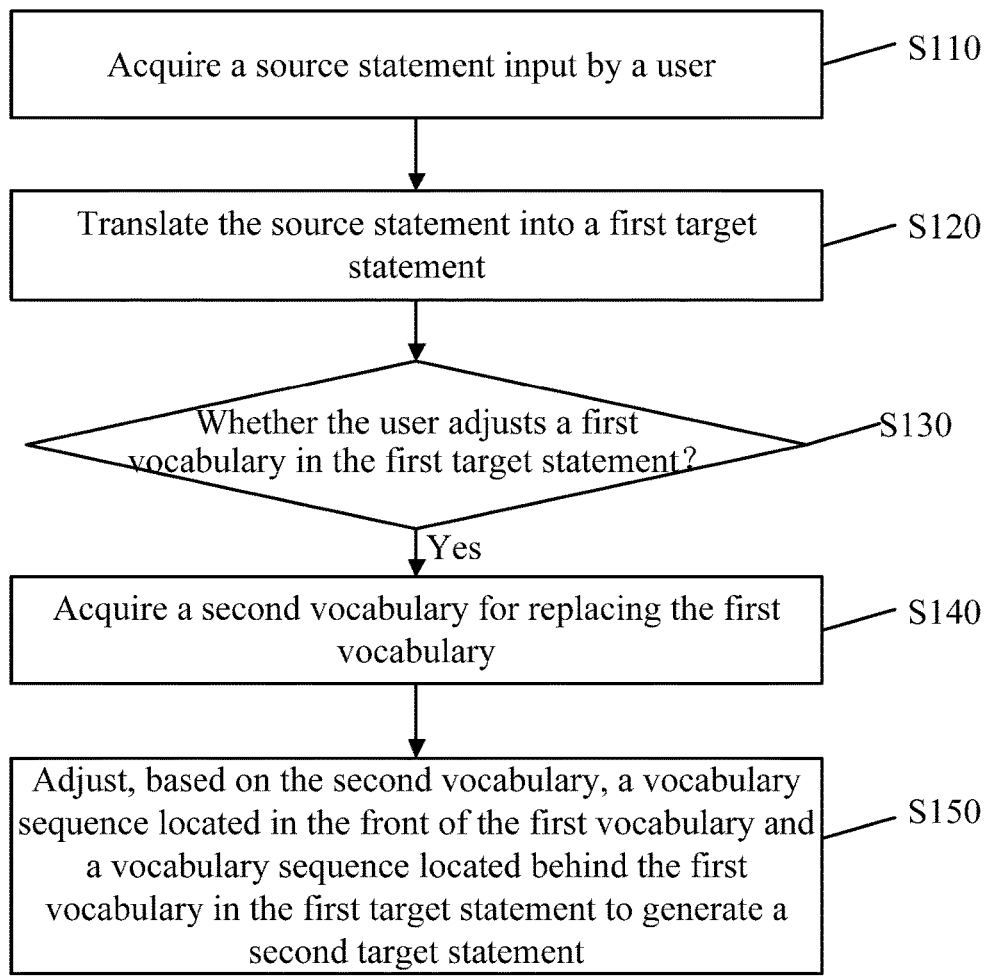
FIG. 1 is a flowchart of an interactive machine translation method according to an embodiment of the present disclosure.

FIG. 1 is a flowchart of an interactive machine translation method according to an embodiment of the present disclosure. This embodiment is applicable to a case of adaptively adjusting translation results according to manual corrections. This method may be executed by an interactive machine translation apparatus configured in an electronic device. The interactive machine translation method provided by the present disclosure will be described below in conjunction with user interfaces shown in FIGS. 2 to 10. As shown in FIG. 1, the interactive machine translation method described in this embodiment includes steps S110 to step S140.

Figure 2:
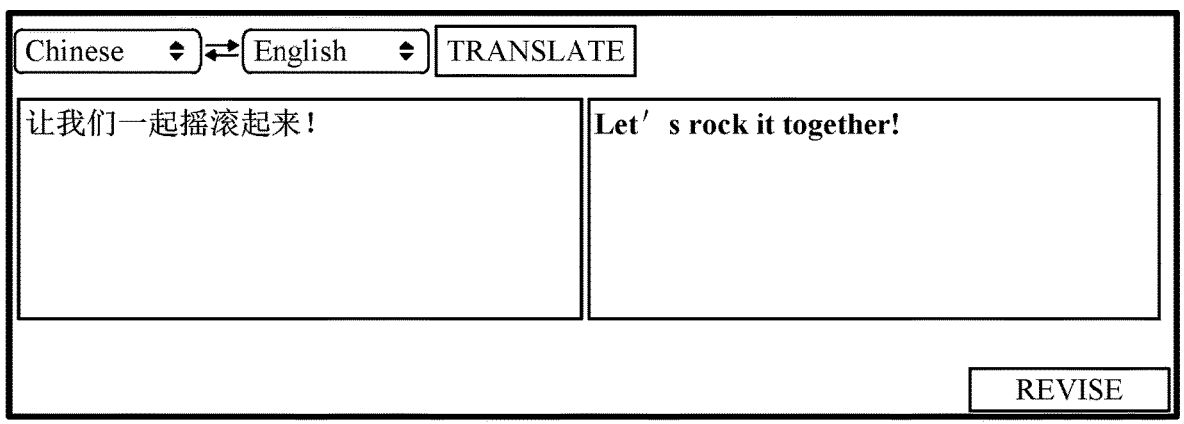
FIG. 2 is a schematic diagram of a graphical user interface embodying an interactive process according to an embodiment of the present disclosure.

In step S110, a source statement input by a user is acquired. FIG. 2 is a schematic diagram of a graphical user interface embodying an interactive process according to an embodiment of the present disclosure. As shown in FIG. 2, the user may input a source statement "让我们一起摇滚起来" in Chinese on the user interface by using a mouse or finger. After the user inputs the source statement, the electronic device performing the method acquires this source statement.

In step S120, the source statement is translated into a first target statement. As shown in FIG. 2, after the user inputs the source statement "让我们一起摇滚起来", the user may click the "TRANSLATE" button on the user interface. The electronic device performing the method acquires this translation instruction, translates the source statement into the first target statement "Let's rock it together!" in English, and displays the first target statement on the user interface shown in FIG. 2.

In some embodiments, the electronic device performing the method may translate the source statement into the first target statement by using a pre-trained translation model. For example, the translation model may use a neural network-based seq2seq model, a statistical translation model or the like. It is to be noted that the embodiments of the present disclosure are not limited to using a translation model to translate the source statement into the first target statement, but may also adopt other manners to implement the translation operation, such as a rule-based machine translation method.

Figures 3, 4, 5:
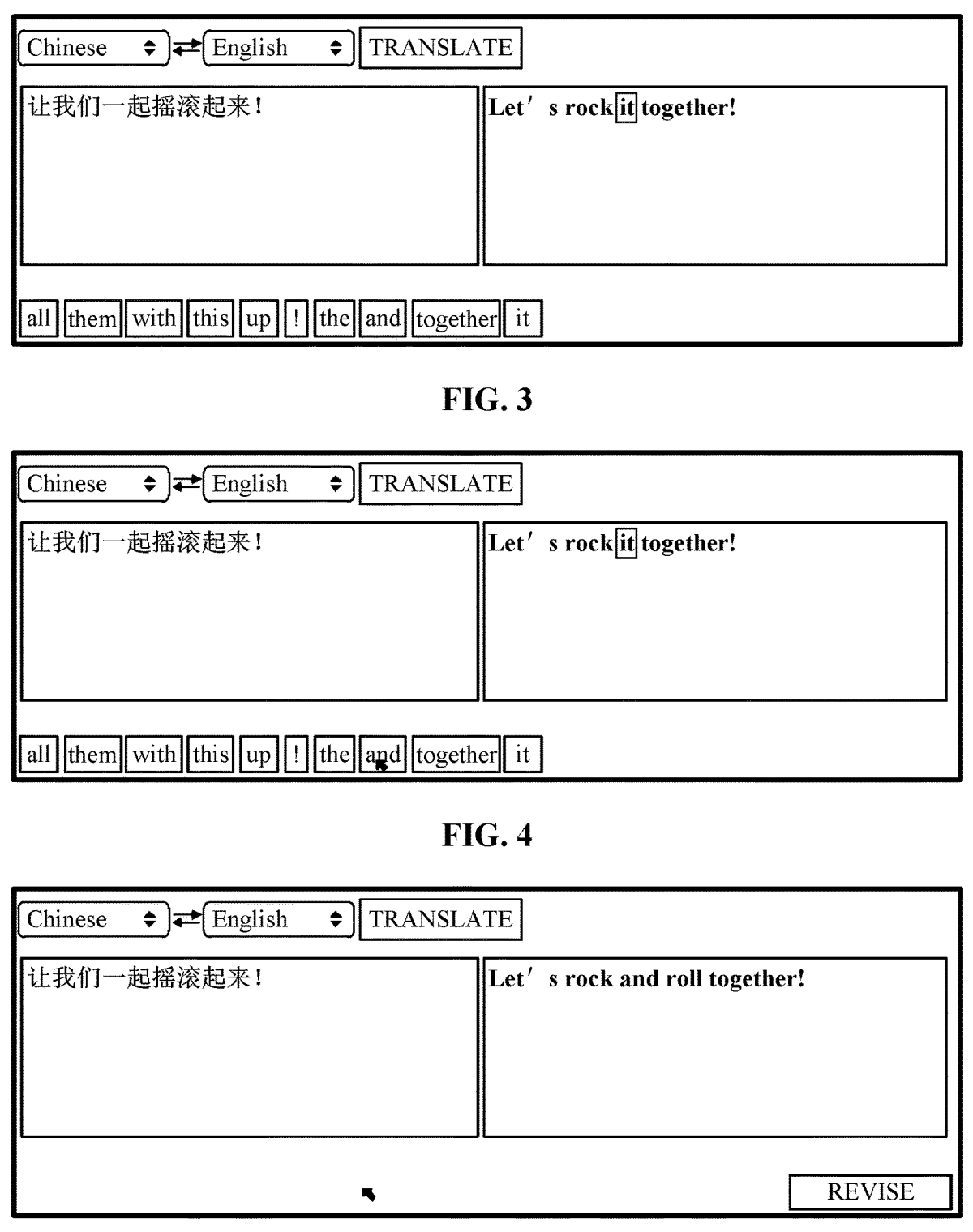

In step S130, whether the user adjusts a first vocabulary in the first target statement is determined. As shown in FIG. 2, after the first target statement "Let's rock it together!" is displayed to the user, the user may check whether there are errors in the first target statement. As shown in FIG. 3, when the user finds that the vocabulary "it" in the target statement is not appropriate, the user may select the vocabulary "it" in the first target statement "Let's rock it together!" by using the mouse or finger. The electronic device performing the method may determine that the user adjusts a first vocabulary "it" in the first target statement based on the selection operation of the user. If the user does not select any vocabulary in the first target statement, it may be determined that the user is relatively satisfied with the translation result and that the user does not adjust any vocabulary in the first target statement.

If in step S130, it is determined that the user adjusts the first vocabulary in the first target statement, the method goes to step S140. In step S140, a second vocabulary for replacing the first vocabulary is acquired. In some embodiments, the second vocabulary may be acquired by providing the user with candidate vocabularies for selection. At least one candidate vocabulary for replacing the first vocabulary may be determined, and then the at least one candidate vocabulary may be displayed to the user for selection. When the user selects a candidate vocabulary from the at least one candidate vocabulary, the selected candidate vocabulary is used as the second vocabulary.

In the embodiment of translating the source statement into the first target statement by using the translation model, at least one candidate vocabulary for replacing the first vocabulary may be determined in the following manner: a position of the first vocabulary in the first target statement is determined, and the at least one candidate vocabulary is acquired from an intermediate result of the translation model based on the position. In the process of translation using the machine translation model, for each vocabulary in the source statement, the machine translation model generates candidate target vocabularies for that vocabulary, and then selects from these candidate target vocabularies (that is, the intermediate result) the target vocabulary which is considered to be appropriate by the model as the translation result for that vocabulary in the source statement. The user needs to adjust the first vocabulary, which indicates that the first vocabulary is inaccurate. In this embodiment, the intermediate result of the machine translation model related to the first vocabulary is displayed to the user so that the user may artificially select a replacement vocabulary (that is, the second vocabulary) that is more accurate than the first vocabulary from the intermediate result, so that the translation result is more accurate while the burden of thinking about using which vocabulary as the replacement on the user is reduced.

In some embodiments, when the user selects the first vocabulary in the first target statement, candidate vocabularies for replacing the first vocabulary may be displayed on the user interface. As shown in FIG. 4, the candidate vocabularies on the user interface for the user to select to replace "it" include "all", "them", "with", "this", "up", "!", "the", "and", "together", and "it". The electronic device performing the method may determine whether the user has selected a candidate vocabulary from these candidate vocabularies. If the user selects one of these candidate vocabularies, the selected candidate vocabulary may be used as the second vocabulary for replacing the first vocabulary. As shown in FIG. 5, the adjustment vocabulary "it" is replaced with the selected candidate vocabulary "and" and the first target statement is adjusted based on the candidate vocabulary "and" to obtain the second target statement "Let's rock and roll together!".

FIGS. 3 to 10 are schematic diagrams of graphical user interfaces embodying the interaction process according to this embodiment. As shown in FIG. 3, after the translated first target statement "Let's rock it together!" is displayed on the right side, if the user selects one of the vocabularies, for example, after the user selects the vocabulary "it", the page is controlled to display at least one candidate vocabulary for the vocabulary "it" to the user, such as "all", "them", "with", "this", "up", "!", "the", "and", "together", and "it" shown in FIG. 3. If the user selects one of these vocabularies, for example, the user selects "and", then "and" may be used as the second vocabulary for replacing the first vocabulary (that is, "it"). After the user selects "and", the page is controlled to jump to the page shown in FIG. 5. As shown in FIG. 5, the user replaces "it" in the first target statement "Let's rock it together!" with "and" and obtains the second target statement "Let's rock and roll together!". The generated second target statement is not simply a statement mechanically modified in response to the replacement operation of the user. Instead, the second target statement is generated by adjusting a vocabulary sequence located in the front of the first vocabulary and a vocabulary sequence located behind the first vocabulary in the first target statement based on the second vocabulary and then displayed.

Figure 6:
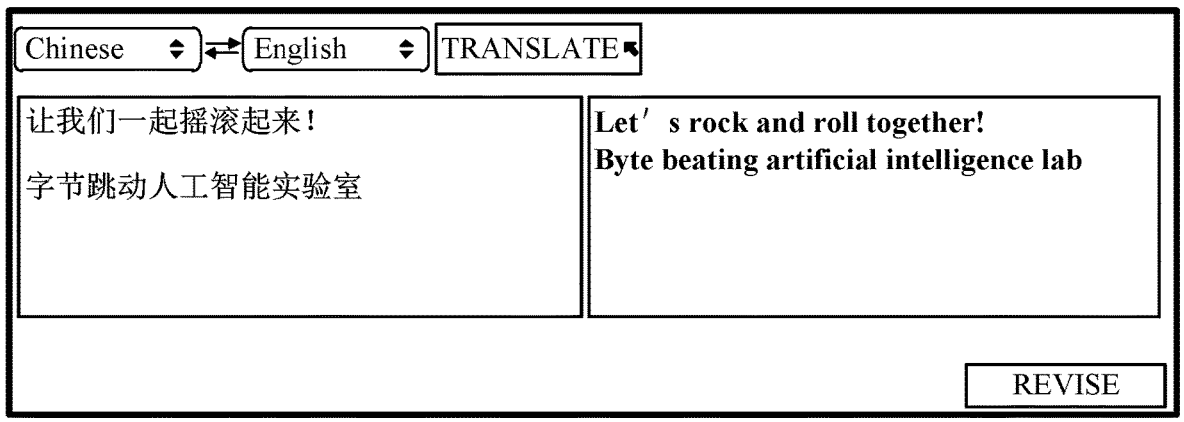
FIG. 6 is a schematic diagram of a graphical user interface embodying an interactive process according to an embodiment of the present disclosure.
Figure 7:
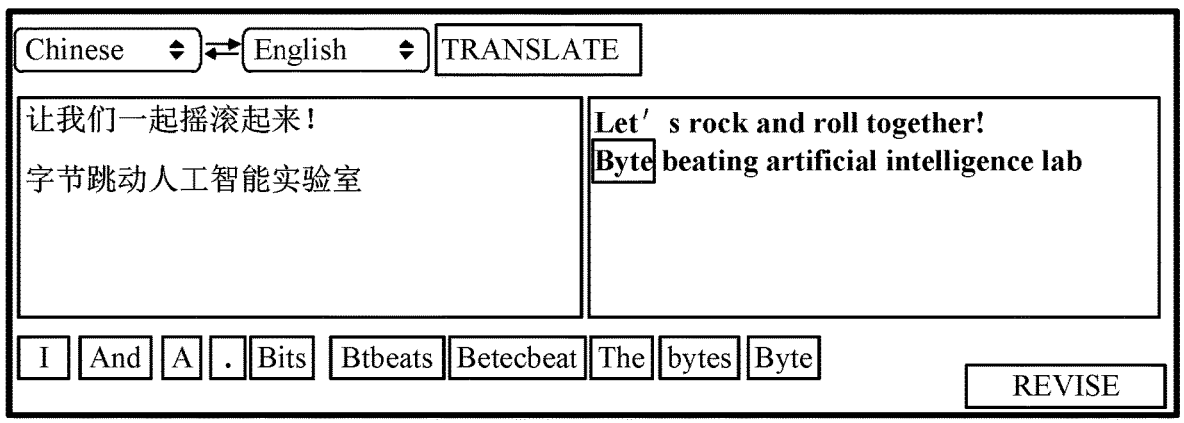
FIG. 7 is a schematic diagram of a graphical user interface embodying an interactive process according to an embodiment of the present disclosure.
Figure 8:
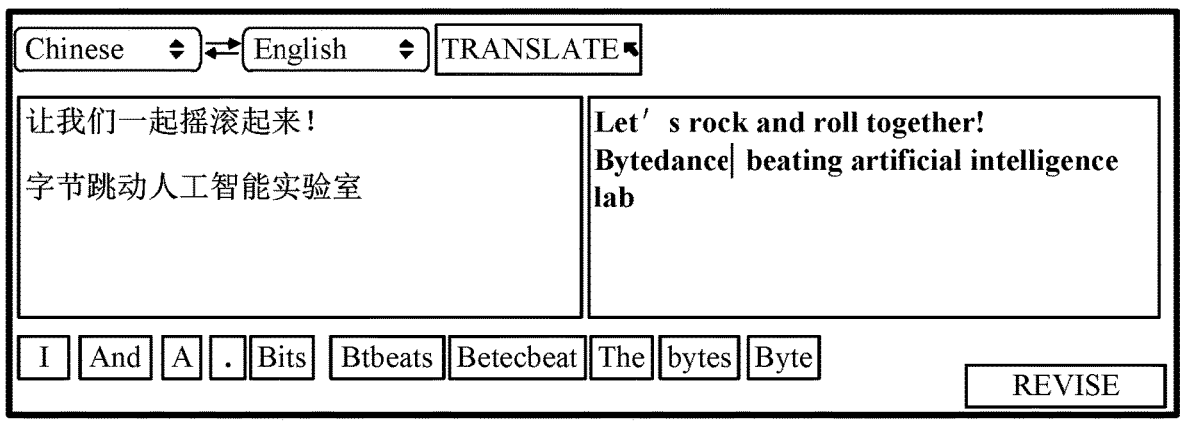
FIG. 8 is a schematic diagram of a graphical user interface embodying an interactive process according to an embodiment of the present disclosure.
Figure 9:
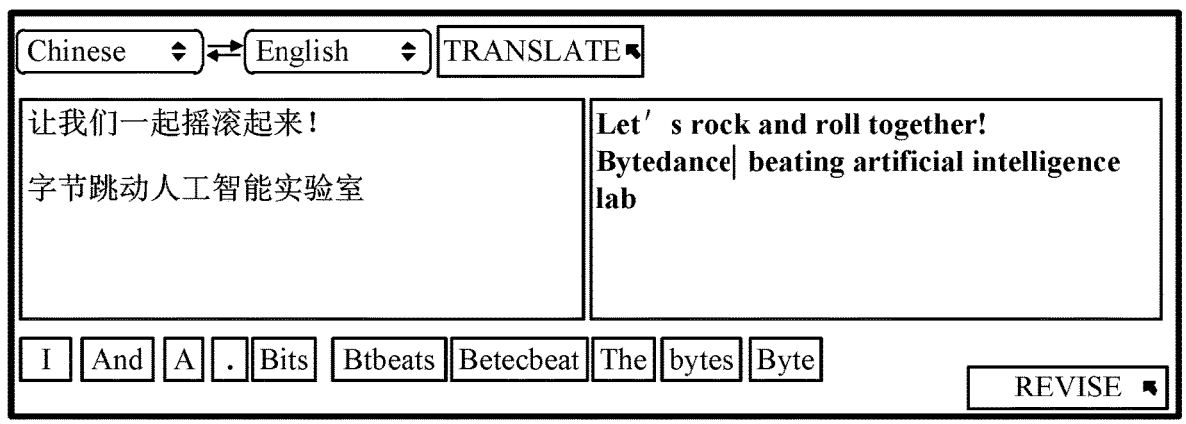
FIG. 9 is a schematic diagram of a graphical user interface embodying an interactive process according to an embodiment of the present disclosure.
Figure 10:
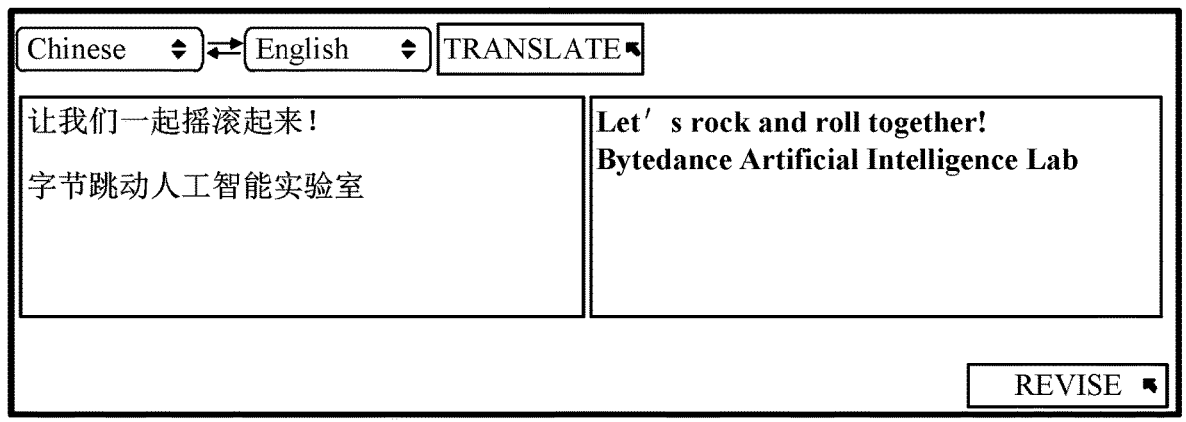
FIG. 10 is a schematic diagram of a graphical user interface embodying an interactive process according to an embodiment of the present disclosure.

In some embodiments, a manner of supporting the input of a replacement vocabulary by the user may also be adopted. The user may input the second vocabulary for replacing the first vocabulary directly on the user interface. The electronic device performing the method may receive the second vocabulary input by the user for replacing the first vocabulary. As shown in FIG. 6, the user then inputs "字节跳动人工智能 实验室" in Chinese, and a translation result "Byte beating artificial intelligence lab" is accordingly displayed on the user interface shown in FIG. 6. If the user selects the vocabulary "Byte" in the translation result, the user may directly input "Bytedance" to replace "Byte", as shown in FIGS. 7 and 8. The user may click the "REVISE" button to adjust "Byte beating artificial intelligence lab" to "Bytedance Artificial Intelligence Lab", as shown in FIGS. 9 and 10.

In step S150, a vocabulary sequence located in the front of the first vocabulary and a vocabulary sequence located behind the first vocabulary in the first target statement are adjusted based on the second vocabulary to generate a second target statement. The electronic device performing the method may generate the second target statement in the following manner: adjusting the vocabulary sequence located behind the first vocabulary as a first vocabulary sequence based on the vocabulary sequence located in the front of the first vocabulary in the first target statement and the second vocabulary, adjusting the vocabulary sequence located in the front of the first vocabulary as a second vocabulary sequence based on the second vocabulary and the first vocabulary sequence, and generating the second target statement based on the second vocabulary sequence and the first vocabulary sequence.

In some embodiments, the source statement may be translated into the first target statement by using the seq2seq translation model. The source statement may be input into the seq2seq translation model, and the vocabulary sequence corresponding to the outputted first target statement may be expressed as $y=\{y_1, \ldots, y_{j-1}, y_j, y_{j+1}, \ldots\}$. It is assumed that the user adjusts the vocabulary $y_j$ to $y_j^r$. The process of adjusting the first target statement based on the second vocabulary to generate the second target statement is described below. A bidirectional decoding mechanism may be introduced into the seq2seq translation model to implement the adjustment of the sequences ($y_{j+1} \ldots$) located behind the first vocabulary (that is, $y_j$) and the sequences ($y_1, \ldots, y_{j-1}$) located in front of the first vocabulary in the first target statement.

After the vocabulary $y_j$ in the vocabulary sequence $y=\{y_1, \ldots y_{j-1}, y_j, y_{j+1}, \ldots\}$ corresponding to the first target statement is manually adjusted, the vocabulary sequence y is divided with $y_j$ as the boundary into two parts, that is, $\{y_1, \ldots, y_{j-1}\}$ and $\{y_{j+1}, \ldots\}$.

In this embodiment, the adopted seq2seq translation model includes two decoders: one is a forward decoder $\overrightarrow{f}$, and the other is an inverse decoder $\overleftarrow{f}$, where $\overrightarrow{f}$ and $\overleftarrow{f}$ shares one encoder, but they operate in sequence.

Formally, during the interaction, the forward decoder $\overrightarrow{f}$ serves as a basic model to generate a basic translation: $y=\{y_1, \ldots, y_j, \ldots\}$. The modification vocabulary $\{y_j \rightarrow y_j^r\}$ is given, that is, the vocabulary $y_j$ is modified to $y_j^r$. Then $\overrightarrow{f}$ generates a new translation result to the right of $y_j$, consistent with the unidirectional model. The new decoding state $S'_{j+1}$ of $\overrightarrow{f}$ at the (j+1)-th position is calculated by using the following formula:

$$\overrightarrow{s}'_{j+1} = \overrightarrow{f}(y_j^r, c'_{j+1}).$$

In the above formula, $y_j^r$ refers to a vocabulary representation vector of the vocabulary $y_j^r$, and it is to be noted that, unlike elsewhere herein, y in the formula refers collectively to its vector representation. $c'_{j+1}$ represents context information at the (j+1)-th position, is calculated by a previous state vector of a hidden layer of the decoder and a state vector of a hidden layer of a source encoder, and may be understood as an input variable. In this case, it is assumed that the new translation result is as follows:

$$\{\ldots, y_{j-2}, y_{j-1}, y_j^r, \underbrace{y'_{j+1}, y'_{j+2}, \ldots}_{\text{New right translation result}}\}.$$

Vocabularies in front of $y_j^r$ remain unchanged, $y'_{j+1}$ is obtained by the following formula, and $y'_{j+2} \ldots$ are obtained in a similar manner:

$$P(y'_{j+1} | y < j+1, x) = \text{soft max}(g(\overrightarrow{s}'_{j+1})).$$

In the above formula, g is a non-linear activation function.

Next, the inverted new right translation result $\{\ldots, y'_{j+2}, y'_{j+1}, y_j^r\}$ may be provided for $\overleftarrow{f}$ as input, and then a new decoding state at the current modification position is obtained, as follows:

$$\overleftarrow{s}'_{j-1} = \overleftarrow{f}(y_j^r, c'_{j+1}).$$

Then, starting from $S'_{j-1}$, $\overleftarrow{f}$ generates the new left translation result $\{y'_{j-1}, y'_{j-2}{}^r, \ldots\}$ according to an inverse decoding probability. The formula is as follows:

$$P(y'_{j-1} | y' > j, y_j^t, x) = \text{soft max}(g(s'_{j-1})).$$

Finally, the following is output:

$$\{\underbrace{\ldots, y'_{j-2}, y'_{j-1}}_{\text{New left translation result}}, y_j^r, \underbrace{y'_{j+1}, y'_{j+2}, \ldots}_{\text{New right translation result}}\}.$$

It is to be noted that the length of the new left translation result may be different from the length of the original left translation result.

In this manner, the entire sentence is jointly updated by the two decoders. After the manual modification, the new right translation result shall be better than the original right translation result. Based on the better right translation result, the new left translation result shall also be better than the original left translation result.

In some embodiments, the translation model training stage is similar to a multitask model, and both decoders may perform training with cross entropy as the target.

In the embodiment of translating the source statement into the first target statement by using the translation model, the translation model may also be updated online by collecting a statement pair composed of the source statement and the second target statement.

In general, adjacent statements processed in a session are highly correlated with each other because they usually belong to the same document or the same field. After the statement translation is completed, the translation model may be updated to maximize the generation probability of the revised sentence in the current round. By learning the interactive history at the statement level, the translation model is more suitable for the statement of the current session so that the translation model can improve the translation quality through continuous learning.

In this embodiment, the source statement input by the user is acquired and then translated into the first target statement, if it is determined that the user adjusts the first vocabulary in the first target statement, in response to this adjustment operation, the second vocabulary for replacing the first vocabulary is acquired, and the vocabulary sequence located in the front of the first vocabulary and the vocabulary sequence located behind the first vocabulary in the first target statement are adjusted based on the second vocabulary to generate the second target statement. According to the interactive machine translation method disclosed in this embodiment, the user can modify the most obvious error occurring at any position in the translation result, and then the translation result in front of the error position and the translation result behind the error position can be adaptively adjusted based on the modification so that the operation frequency of active error correction of the user can be reduced, the interaction efficiency can be significantly improved, and the accuracy of the translation result can be improved.

Figure 11:
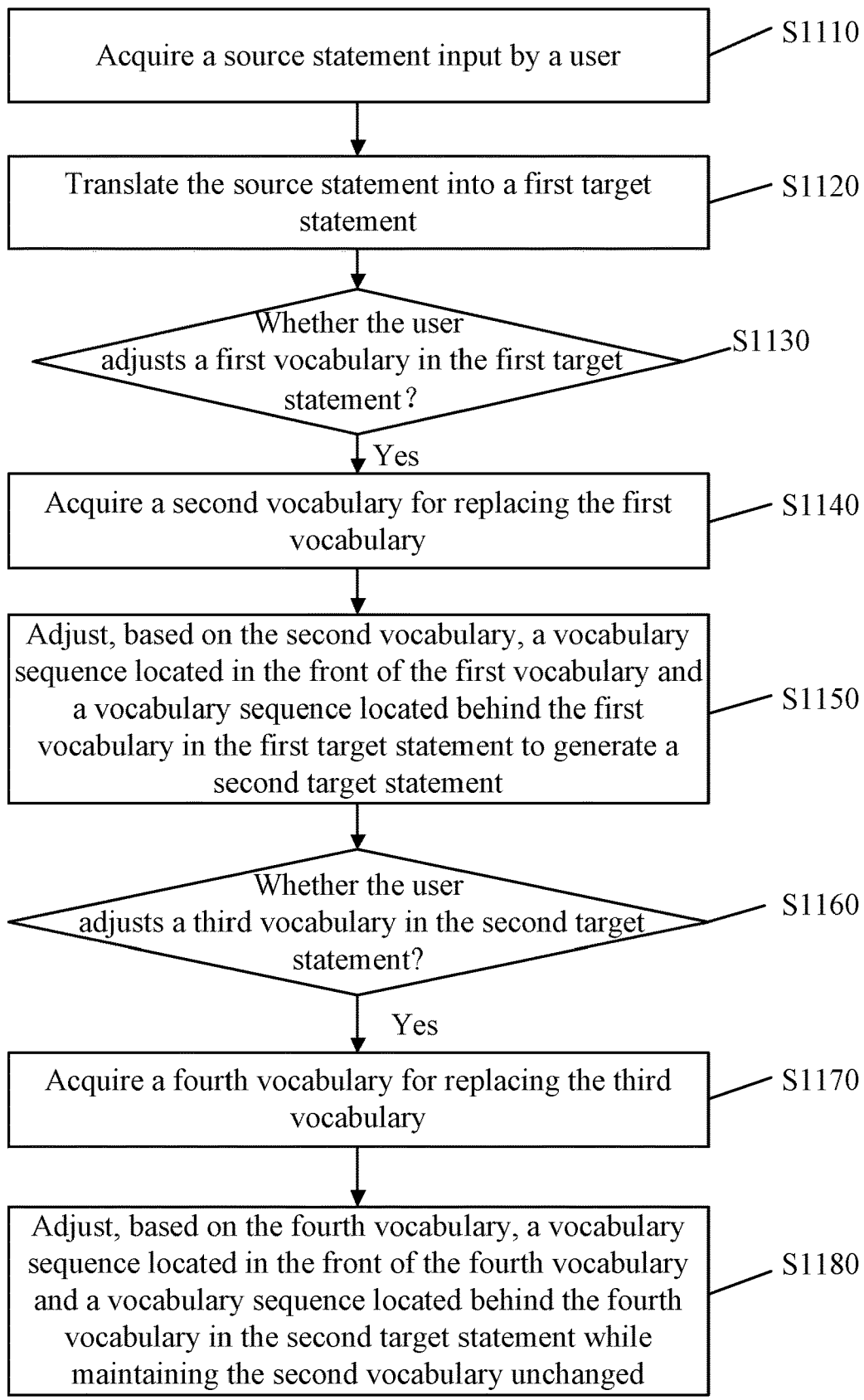
FIG. 11 is a flowchart of another interactive machine translation method according to an embodiment of the present disclosure.

FIG. 11 is a flowchart of another interactive machine translation method according to an embodiment of the present disclosure. This embodiment has been optimized and improved based on the preceding embodiment. The interactive machine translation method provided by the present disclosure will be described below in conjunction with user interfaces shown in FIGS. 6 to 10. As shown in FIG. 11, the interactive machine translation method described in this embodiment includes steps S1110 to step S1180.

In step S1110, a source statement input by a user is acquired. As shown in FIG. 6, the user may input a second source statement "字节跳动人工智能 实验室" in Chinese on the user interface by using the mouse or finger. After the user inputs the second source statement, the electronic device performing the method acquires this second source statement.

In step S1120, the source statement is translated into a first target statement. As shown in FIG. 6, after the user inputs the second source statement "字节跳动人工智能 实验室", the user may click the "TRANSLATE" button on the user interface. The electronic device performing the method acquires this translation instruction, translates the second source statement into the first target statement "Byte beating artificial intelligence lab" in English, and displays the first target statement corresponding to the second source statement on the user interface shown in FIG. 6.

In step S1130, whether the user adjusts a first vocabulary in the first target statement is determined. If it is determined that the user adjusts the first vocabulary in the first target statement, steps S1140 to S1150 are performed. As shown in FIG. 7, when the user finds that the vocabulary "Byte" in the target statement corresponding to the second source statement is not appropriate, the user may select the vocabulary "Byte" in the first target statement "Byte beating artificial intelligence lab" corresponding to the second source statement by using the mouse or finger. The electronic device performing the method may determine that the user adjusts the first vocabulary "Byte" in the first target statement corresponding to the second source statement based on the selection operation of the user.

In step S1140, a second vocabulary for replacing the first vocabulary is acquired. In some embodiments, a manner of supporting the input of the replacement vocabulary by the user may also be adopted. For example, at least one candidate vocabulary for replacing the first vocabulary is determined, the at least one candidate vocabulary is displayed to the user, whether the user selects a candidate vocabulary from the at least one candidate vocabulary is determined, and in response to the user selecting a candidate vocabulary from the at least one candidate vocabulary, the selected candidate vocabulary is used as the second vocabulary.

If the operation of step S1120 is implemented by using a translation model, at least one candidate vocabulary for replacing the first vocabulary may be determined in the following manner a position of the first vocabulary in the first target statement is determined, and the at least one candidate vocabulary is acquired from an intermediate result of the translation model based on the position.

In some embodiments, when the user selects the first vocabulary in the first target statement, candidate vocabularies for replacing the first vocabulary may be displayed on the user interface. As shown in FIG. 7, the candidate vocabularies on the user interface for the user to select to replace "Byte" include "I", "And", "A", ".", "Bits", "Btbeats", "Betecbeat", "The", "bytes", and "Byte". The electronic device performing the method may determine whether the user has selected a candidate vocabulary from these candidate vocabularies. If the user selects one of these candidate vocabularies, the selected candidate vocabulary may be used as the second vocabulary for replacing the first vocabulary. If there is no appropriate replacement vocabulary in these candidate vocabularies, a manner of supporting the input of the replacement vocabulary by the user may also be adopted.

As shown in FIG. 8, after the user modifies the adjustment vocabulary "Byte" to the candidate vocabulary "Bytedance" that is directly input, the electronic device performing the method obtains this candidate vocabulary "Bytedance" as the second vocabulary for replacing the first vocabulary.

In step S1150, a vocabulary sequence located in the front of the first vocabulary and a vocabulary sequence located behind the first vocabulary in the first target statement are adjusted based on the second vocabulary to generate a second target statement. As shown in FIG. 8, the user modifies the adjustment vocabulary "Byte" to the vocabulary "Bytedance" that is directly input, and the electronic device performing the method obtains this input vocabulary "Bytedance" and adjusts the first target statement to "Bytedance beating artificial intelligence lab", as shown in FIG. 9. The user clicks the "REVISE" button, and the electronic device performing the method adjusts vocabulary sequences in front of and behind the vocabulary "Byte" in the first target statement "Byte beating artificial intelligence lab" based on the vocabulary "Bytedance" to obtain the second target statement "Bytedance Artificial Intelligence Lab". The display effect is shown in FIG. 10.

In step S1160, whether the user adjusts a third vocabulary in the second target statement is determined. If it is determined that the user adjusts the third vocabulary in the second target statement, steps S1170 to S1180 are performed. For example, after the second target statement "Bytedance Artificial Intelligence Lab" corresponding to the second source statement is displayed to the user, the user may continue to check whether an error still exists in the second target statement corresponding to the second source statement. If the user finds that the second target statement corresponding to the second source statement still needs to be adjusted, the user may select a vocabulary which needs to be adjusted in the second target statement "Bytedance Artificial Intelligence Lab" by using the mouse or finger. The electronic device performing the method may determine that the user adjusts the third vocabulary in the second target statement based on the selection operation of the user. If the user does not select any vocabulary in the second target statement, it may be determined that the user is relatively satisfied with the translation result and that the user does not adjust any vocabulary in the second target statement.

In step S1170, a fourth vocabulary for replacing the third vocabulary is acquired. This step is the same as step S1140 and will not be repeated herein.

In step S1180, a vocabulary sequence located in the front of the fourth vocabulary and a vocabulary sequence located behind the fourth vocabulary in the second target statement are adjusted based on the fourth vocabulary while maintaining the second vocabulary unchanged. For example, if the third vocabulary is located behind the first vocabulary, the electronic device performing the method may control the translation model to re-determine the subsequent vocabulary sequence located behind the third vocabulary in the second target sentence based on the fourth vocabulary, generate a third target statement, and display the third target statement to the user. If the third vocabulary is located in front of the first vocabulary, the electronic device performing the method, on the premise of remaining the second vocabulary, may control the translation model to re-determine the subsequent vocabulary sequence located behind the third vocabulary in the second target statement based on the second vocabulary and the fourth vocabulary, generate a fourth target statement, and display the fourth target statement to the user.

The operation in which the electronic device performing the method, on the premise of remaining the second vocabulary, controls the translation model to re-determine the subsequent vocabulary sequence located behind the third vocabulary in the second target statement based on the second vocabulary and the fourth vocabulary, generates the fourth target statement, and display the fourth target statement to the user may be implemented in various manners. For example, the electronic device performing the method may control the translation model to perform decoding probability calculation to calculate a first decoding probability corresponding to a decoding manner for selecting the second vocabulary at the position where the second vocabulary is located, a second decoding probability corresponding to a decoding manner for selecting the second vocabulary at a previous position of the second vocabulary, and a third decoding probability corresponding to a decoding manner for selecting the second vocabulary at a next position of the second vocabulary, determine a decoding manner corresponding to the maximum value among the first decoding probability, the second decoding probability, and the third decoding probability, and re-determine the subsequent vocabulary sequence of the third vocabulary based on the determined decoding manner and the fourth vocabulary to obtain the fourth target statement.

On the basis of the preceding embodiment, this embodiment further discloses a scheme in which the user successively readjusts the translation result twice. After the second target statement is obtained in response to one adjustment operation of the user, if it is detected that the user adjusts the third vocabulary in the second target statement, the fourth vocabulary for replacing the third vocabulary is acquired, and the vocabulary sequence located in front of the fourth vocabulary and the vocabulary sequence located behind the fourth vocabulary in the second target statement are adjusted based on the fourth vocabulary while maintaining the second vocabulary unchanged. In this manner, the next adjustment can be prevented from overlaying the previous adjustment, and the translation quality can be improved.

Figure 12:
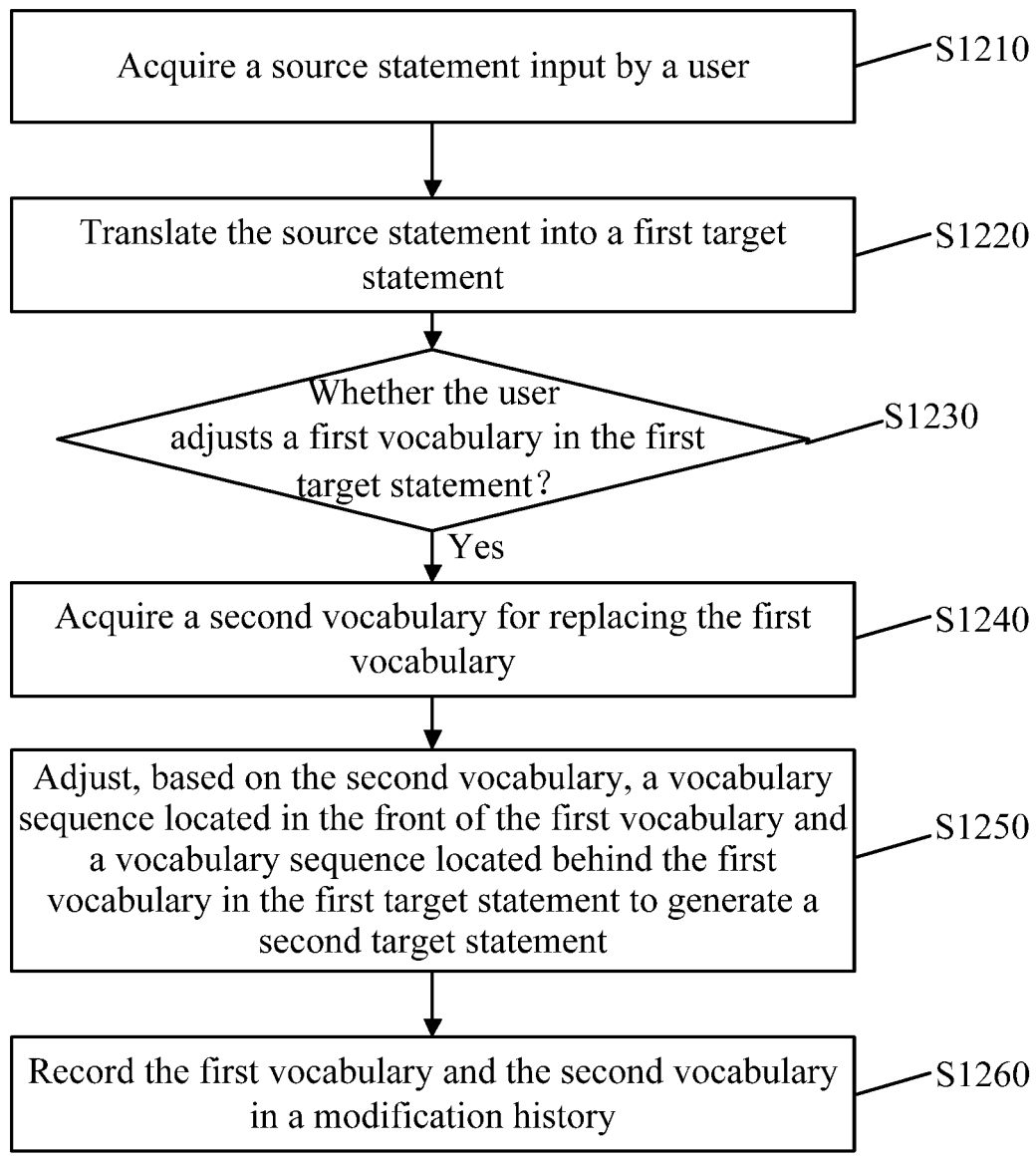
FIG. 12 is a flowchart of another interactive machine translation method according to an embodiment of the present disclosure.

FIG. 12 is a flowchart of another interactive machine translation method according to an embodiment of the present disclosure. This embodiment has been optimized and improved based on the preceding embodiment. The interactive machine translation method provided by the present disclosure will be described below in conjunction with user interfaces shown in FIGS. 6 to 10. As shown in FIG. 12, the interactive machine translation method described in this embodiment includes steps S1210 to step S1260.

In step S1210, a source statement input by a user is acquired. This step is the same as step S1110 of the embodiment shown in FIG. 11. As shown in FIG. 6, the user may input the second source statement "字节跳动人工智能实验室" in Chinese on the user interface by using the mouse or finger. After the user inputs the second source statement, the electronic device performing the method acquires this second source statement.

In step S1220, the source statement is translated into a first target statement. This step is the same as step S1120 of the embodiment shown in FIG. 11. As shown in FIG. 6, after the user inputs the second source statement "字节跳动人工智能 实验室" in Chinese, the user may click the "TRANSLATE" button on the user interface. The electronic device performing the method acquires this translation instruction, translates the second source statement into the first target statement "Byte beating artificial intelligence lab" in English, and displays the first target statement corresponding to the second source statement on the user interface shown in FIG. 6.

In step S1230, whether the user adjusts a first vocabulary in the first target statement is determined. If it is determined that the user adjusts the first vocabulary in the first target statement, steps S1240 to S1250 are performed. As shown in FIG. 7, when the user finds that the vocabulary "Byte" in the target statement corresponding to the second source statement is not appropriate, the user may select the vocabulary "Byte" in the first target statement "Byte beating artificial intelligence lab" corresponding to the second source statement by using the mouse or finger. The electronic device performing the method may determine that the user adjusts the first vocabulary "Byte" in the first target statement corresponding to the second source statement based on the selection operation of the user.

In step S1240, a second vocabulary for replacing the first vocabulary is acquired. As shown in FIG. 8, after the user modifies the adjustment vocabulary "Byte" to the vocabulary "Bytedance" that is directly input, the electronic device performing the method obtains this candidate vocabulary "Bytedance" as the second vocabulary for replacing the first vocabulary.

In step S1250, a vocabulary sequence located in the front of the first vocabulary and a vocabulary sequence located behind the first vocabulary in the first target statement are adjusted based on the second vocabulary to generate a second target statement. As shown in FIG. 10, after the user modifies the vocabulary "Byte" to the vocabulary "Bytedance", the electronic device performing the method adjusts vocabulary sequences in front of and behind the vocabulary "Byte" in the first target statement "Byte beating artificial intelligence lab" based on the vocabulary "Bytedance" to obtain the second target statement "Bytedance Artificial Intelligence Lab".

In step S1260, the first vocabulary and the second vocabulary are recorded in a modification history. The modification history may be used for determining a modification intention of the user to determine whether to adjust a target statement following the second target statement according to the modification intention. For example, the adjustment vocabulary "Byte" and the replacement vocabulary "Bytedance" are recorded in the modification history.

The operation of adjusting the target statement following the second target statement according to the modification intention may be performed in the manner described below.

A recommended adjustment vocabulary and a recommended correction vocabulary of a to-be-adjusted target statement are determined according to the modification intention; the recommended correction vocabulary is displayed at a position adjacent to the recommended adjustment vocabulary to the user for selecting; the recommended adjustment vocabulary is replaced with the recommended correction vocabulary if the user selects the recommended correction vocabulary; a replacement result is updated into a translation model that re-determines a vocabulary sequence located in front of the recommended correction vocabulary and a vocabulary sequence located behind the recommended correction vocabulary based on the replacement result to obtain a fifth target statement; and the fifth target statement is displayed to the user for browsing.

On the basis of the embodiment shown in FIG. 11, in this embodiment, after the adjustment operation of the user is responded, the vocabulary adjusted by the user is recorded so as to determine the modification intention of the user based on the recording result, and whether to adjust the target statement after the second target statement is further determined. After the modification intention of the user is extracted according to the modification operation of the user, the full-text modification or modification setting can be performed according to the modification intention of the user. Therefore, the number of vocabularies to be adjusted by manual correction can be further reduced, and the translation quality and the translation efficiency can be further improved.

Figure 13:
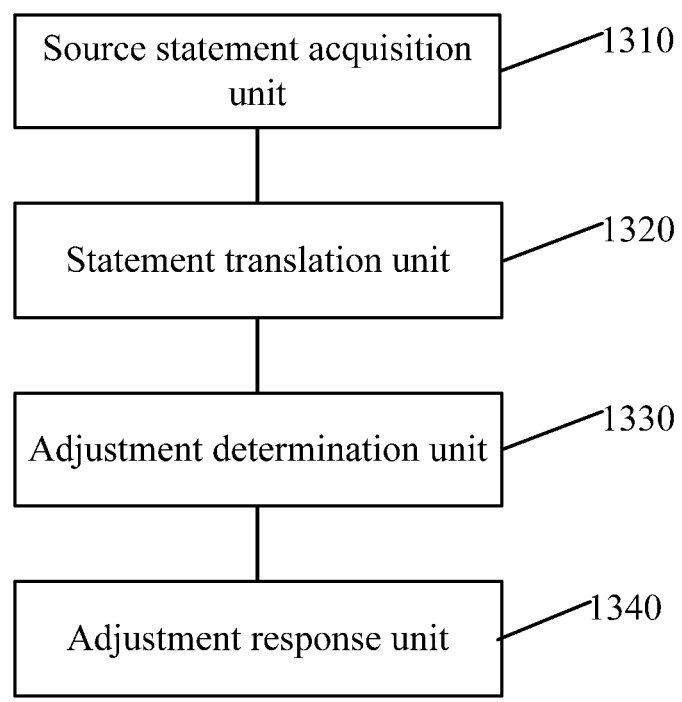
FIG. 13 is a structural diagram of an interactive machine translation apparatus according to an embodiment of the present disclosure.

As an implementation of the method shown in each of the above figures, the present disclosure provides an embodiment of an interactive machine translation apparatus. FIG. 13 is a structural diagram of an interactive machine translation apparatus according to an embodiment of the present embodiment. The apparatus embodiment corresponds to the method embodiments shown in FIGS. 1 to 12. The apparatus may be applicable to various electronic devices. As shown in FIG. 13, the interactive machine translation apparatus described in this embodiment includes a source statement acquisition unit 1310, a statement translation unit 1320, an adjustment determination unit 1330, and an adjustment response unit 1340.

The source statement acquisition unit 1310 is configured to acquire a source statement input by a user.

The statement translation unit 1320 is configured to translate the source statement into a first target statement.

The adjustment determination unit 1330 is configured to determine whether the user adjusts a first vocabulary in the first target statement.

The adjustment response unit 1340 is configured to, in response to determining that the user adjusts the first vocabulary in the first target statement, acquire a second vocabulary for replacing the first vocabulary, and based on the second vocabulary, adjust a vocabulary sequence located in the front of the first vocabulary and a vocabulary sequence located behind the first vocabulary in the first target statement to generate a second target statement.

In one embodiment, the adjustment determination unit 1330 is configured to determine whether the user performs a selection operation on the first vocabulary, and in response to determining that the user performs the selection operation on the first vocabulary, determine that the user adjusts the first vocabulary.

In one embodiment, the adjustment response unit 1340 is configured to determine at least one candidate vocabulary for replacing the first vocabulary, display the at least one candidate vocabulary to the user, determine whether the user selects a candidate vocabulary from the at least one candidate vocabulary, and in response to determining that the user selects the candidate vocabulary from the at least one candidate vocabulary, use the selected candidate vocabulary as the second vocabulary.

In one embodiment, the adjustment response unit 1340 is configured to receive the second vocabulary input by the user for replacing the first vocabulary.

In one embodiment, the statement translation unit 1320 is configured to translate the source statement into the first target statement by using a translation model, and the adjustment response unit 1340 is further configured to determine a position of the first vocabulary in the first target statement, and based on the position, acquire the at least one candidate vocabulary from an intermediate result of the translation model.

In one embodiment, the adjustment response unit 1340 is configured to adjust the vocabulary sequence located behind the first vocabulary as a first vocabulary sequence based on the second vocabulary, adjust the vocabulary sequence located in the front of the first vocabulary as a second vocabulary sequence based on the second vocabulary and the first vocabulary sequence, and generate the second target statement based on the second vocabulary sequence and the first vocabulary sequence.

In one embodiment, the apparatus further includes an adjustment record unit (not shown in FIG. 13). The adjustment record unit is configured to record the first vocabulary and the second vocabulary in a modification history, where the modification history is used for determining a modification intention of the user to determine whether to adjust a target statement following the second target statement according to the modification intention.

Furthermore, the adjustment record unit is further configured to determine a recommended adjustment vocabulary and a recommended correction vocabulary of a to-be-adjusted target statement according to the modification intention, display the recommended correction vocabulary at a position adjacent to the recommended adjustment vocabulary to the user for selecting, replace the recommended adjustment vocabulary with the recommended correction vocabulary if the user selects the recommended correction vocabulary, update a replacement result into a translation model that re-determines a vocabulary sequence located in front of the recommended correction vocabulary and a vocabulary sequence located behind the recommended correction vocabulary based on the replacement result to obtain a fifth target statement, and display the fifth target statement to the user for browsing.

In one embodiment, the statement translation unit 1320 is configured to translate the source statement into the first target statement by using a pre-trained model, and the apparatus further includes a model updating unit (not shown in FIG. 13). The model updating unit is configured to update the model by using the source statement and the second target statement.

The interactive machine translation apparatus provided by this embodiment can perform the interactive machine translation method provided by embodiments of the present disclosure and has functional modules and effects corresponding to the performed method.

Figure 14:
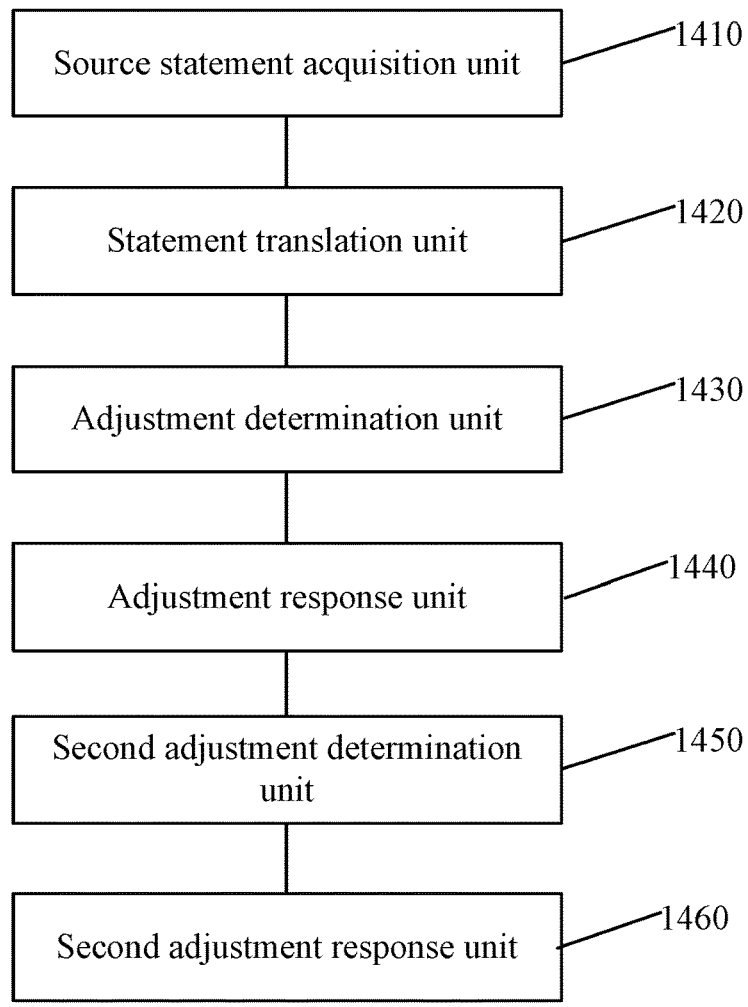
FIG. 14 is a structural diagram of another interactive machine translation apparatus according to an embodiment of the present disclosure.

FIG. 14 is a structural diagram of another interactive machine translation apparatus according to an embodiment of the present disclosure. As shown in FIG. 14, the interactive machine translation apparatus described in this embodiment includes a source statement acquisition unit 1410, a statement translation unit 1420, an adjustment determination unit 1430, an adjustment response unit 1440, a second adjustment determination unit 1450, and a second adjustment response unit 1460.

The source statement acquisition unit 1410 is configured to acquire a source statement input by a user.

The statement translation unit 1420 is configured to translate the source statement into a first target statement.

The adjustment determination unit 1430 is configured to determine whether the user adjusts a first vocabulary in the first target statement.

The adjustment response unit 1440 is configured to, in response to determining that the user adjusts the first vocabulary in the first target statement, acquire a second vocabulary for replacing the first vocabulary, and based on the second vocabulary, adjust a vocabulary sequence located in the front of the first vocabulary and a vocabulary sequence located behind the first vocabulary in the first target statement to generate a second target statement.

The second adjustment determination unit 1450 is configured to determine whether the user adjusts a third vocabulary in the second target statement after the second target statement is generated.

The second adjustment response unit 1460 is configured to, in response to determining that the user adjusts the third vocabulary in the second target statement, acquire a fourth vocabulary for replacing the third vocabulary, and based on the fourth vocabulary, adjust a vocabulary sequence located in the front of the fourth vocabulary and a vocabulary sequence located behind the fourth vocabulary in the second target statement while maintaining the second vocabulary unchanged.

In one embodiment, the adjustment determination unit 1430 is configured to determine whether the user performs a selection operation on the first vocabulary, and in response to determining that the user performs the selection operation on the first vocabulary, determine that the user adjusts the first vocabulary.

In one embodiment, the adjustment response unit 1440 is configured to determine at least one candidate vocabulary for replacing the first vocabulary, display the at least one candidate vocabulary to the user, determine whether the user selects a candidate vocabulary from the at least one candidate vocabulary, and in response to determining that the user selects the candidate vocabulary from the at least one candidate vocabulary, use the selected candidate vocabulary as the second vocabulary.

In one embodiment, the adjustment response unit 1440 is configured to receive the second vocabulary input by the user for replacing the first vocabulary.

In one embodiment, the statement translation unit 1420 is configured to translate the source statement into the first target statement by using a translation model, and the adjustment response unit 1440 is further configured to determine a position of the first vocabulary in the first target statement, and based on the position, acquire the at least one candidate vocabulary from an intermediate result of the translation model.

In one embodiment, the adjustment response unit 1440 is configured to adjust the vocabulary sequence located behind the first vocabulary as a first vocabulary sequence based on the second vocabulary, adjust the vocabulary sequence located in the front of the first vocabulary as a second vocabulary sequence based on the second vocabulary and the first vocabulary sequence, and generate the second target statement based on the second vocabulary sequence and the first vocabulary sequence.

The interactive machine translation apparatus provided by this embodiment can perform the interactive machine translation method provided by embodiments of the present disclosure and has functional modules and effects corresponding to the performed method.

Figure 15:
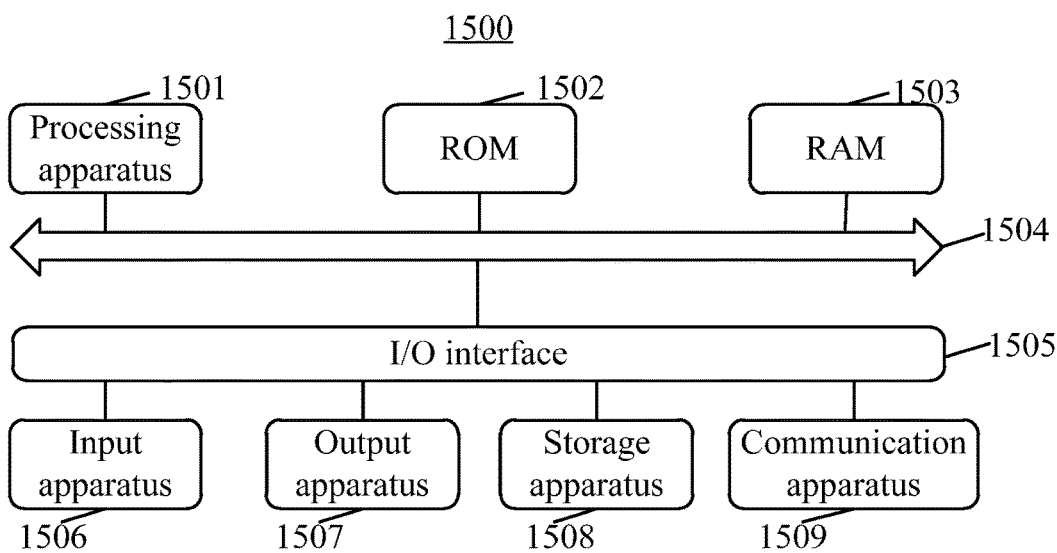
FIG. 15 is a structural diagram of an electronic device applicable to implementing the embodiments of the present disclosure.

Referring to FIG. 15, FIG. 15 is a structural diagram of an electronic device 1500 for implementing the embodiments of the present disclosure. The terminal device in the embodiments of the present disclosure may include, but is not limited to, mobile terminals such as a mobile phone, a laptop, a digital broadcast receiver, a personal digital assistant (PDA), a pad (tablet computer), a portable media player (PMP), and an in-vehicle terminal (such as an in-vehicle navigation terminal), and stationary terminals such as a digital television (TV) and a desktop computer. The electronic device shown in FIG. 15 is merely an example and is not intended to limit the function and usage scope of the embodiments of the present disclosure.

As shown in FIG. 15, the electronic device 1500 may include a processing apparatus 1501 (such as a central processing unit, a graphics processing unit and the like). The processing apparatus 1501 may execute various types of appropriate operations and processing based on a program stored in a read-only memory (ROM) 1502 or a program loaded from a storage apparatus 1508 into a random access memory (RAM) 1503. Various programs and data required for the operation of the electronic device 1500 are also stored in the RAM 1503. The processing apparatus 1501, the ROM 1502, and the RAM 1503 are connected to each other through a bus 1504. An input/output (I/O) interface 1505 is also connected to the bus 1504.

Generally, the following apparatus may be connected to the I/O interface 1505: an input apparatus 1506 including such as a touch screen, a touch pad, a keyboard, a mouse, a camera, a microphone, an accelerometer, and a gyroscope, an output apparatus 1507 including such as a liquid crystal display (LCD), a speaker, and a vibrator, a storage apparatus 1508 including such as a magnetic tape, and a hard disk, and a communication apparatus 1509. The communication apparatus 1509 may allow the electronic device 1500 to perform wireless or wired communication with other devices to exchange data. Although FIG. 15 shows the electronic device 1500 having various apparatuses, it is to be understood that all of the apparatuses shown herein do not need to be implemented or present. Alternatively, the electronic device 600 may be implemented or be equipped with more or fewer apparatuses.

Particularly, according to the embodiments of the present disclosure, the process described above with reference to the flowcharts may be implemented as computer software programs. For example, the embodiments of the present disclosure include a computer program product. The computer program product includes a computer program carried in a computer-readable medium. The computer program includes program codes for performing the methods shown in the flowcharts. In such an embodiment, the computer program may be downloaded from the network and installed through the communication apparatus 1509, or may be installed from the storage apparatus 1508, or may be installed from the ROM 1502. When the computer program is executed by the processing apparatus 1501, the preceding functions defined in the methods of the embodiments of the present disclosure are executed.

It is to be noted that the computer-readable medium described in the embodiment of the present disclosure may be a computer-readable signal medium, or a computer-readable storage medium, or any combination thereof. The computer-readable storage medium may be, but is not limited to, an electrical, magnetic, optical, electromagnetic, infrared or semiconductor system, apparatus or device, or any combination thereof. More specific examples of the computer-readable storage medium may include, but are not limited to: an electrical connection having one or more wires, a portable computer magnetic disk, a hard disk, an RAM, an ROM, an erasable programmable read-only memory (EPROM or flash memory), an optical fiber, a portable compact disk read-only memory (CD-ROM), an optical memory device, a magnetic memory device, or any suitable combination thereof. In the embodiments of the present disclosure, the computer-readable storage medium may be any tangible medium including or storing a program. The program may be used by or in conjunction with an instruction execution system, apparatus or device. In the embodiments of the present disclosure, the computer-readable signal medium may include a data signal propagated on a base band or as a part of a carrier wave. Computer-readable program codes are carried in the data signal. Such a propagated data signal may be in multiple forms including, but not limited to, an electromagnetic signal, an optical signal or any appropriate combination thereof. The computer-readable signal medium may further be any computer-readable medium other than a computer-readable storage medium. The computer-readable signal medium may send, propagate or transmit a program used by or used in conjunction with an instruction execution system, apparatus or device. The program codes included in the computer-readable medium may be transmitted in any suitable medium, including, but not limited to, a wire, an optical cable, a radio frequency (RF), or any suitable combination thereof.

The preceding computer-readable medium may be included in the preceding electronic device, or may exist alone without being assembled into the electronic device.

The preceding computer-readable medium carries one or more programs which, when executed by the electronic device, cause the electronic device to perform the following operations: acquiring a source statement input by a user; translating the source statement into a first target statement;

determining whether the user adjusts a first vocabulary in the first target statement; and in response to determining that the user adjusts the first vocabulary in the first target statement, acquiring a second vocabulary for replacing the first vocabulary, and adjusting, based on the second vocabulary, a vocabulary sequence located in the front of the first vocabulary and a vocabulary sequence located behind the first vocabulary in the first target statement to generate a second target statement.

Computer program codes for performing the operations of the embodiments of the present disclosure may be written in one or more programming languages or combinations thereof. The preceding one or more programming languages include object-oriented programming languages such as Java, Smalltalk, C++, as well as conventional procedural programming languages such as "C" or similar programming languages. The program codes may be executed entirely on a user computer, partly on the user computer, as a stand-alone software package, partly on the user computer and partly on a remote computer, or entirely on the remote computer or server. In the case relating to the remote computer, the remote computer may be connected to the user computer via any type of network, including a local area network (LAN) or a wide area network (WAN), or the connection may be made to an external computer (for example, through the Internet using an Internet service provider).

The flowcharts and block diagrams in the figures illustrate the architecture, functionality, and operation of possible implementations of systems, methods, and computer program products according to the embodiments of the present disclosure. In this regard, each block in the flowcharts or block diagrams may represent a module, program segment, or portion of code, which includes one or more executable instructions for implementing the specified logical functions. It is also to be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. It is also to be noted that each block of the block diagrams and/or flowcharts, and combinations of blocks in the block diagrams and/or flowcharts can be implemented by specific purpose hardware-based systems which perform the specified functions or operations, or combinations of specific purpose hardware and computer instructions.

The units involved in the embodiments of the present disclosure may be implemented by software or hardware. The names of the units do not constitute a limitation on the units themselves. For example, the first acquisition unit may also be described as "a unit for acquiring at least two Internet protocol addresses".

According to one or more embodiments of the present disclosure, in the interactive machine translation method, the step in which whether the user adjusts the first vocabulary in the first target statement is determined includes: determining whether the user performs a selection operation on the first vocabulary, and in response to determining that the user performs the selection operation on the first vocabulary, determining that the user adjusts the first vocabulary.

According to one or more embodiments of the present disclosure, in the interactive machine translation method, the step in which the second vocabulary for replacing the first vocabulary is acquired includes: determining at least one candidate vocabulary for replacing the first vocabulary, displaying the at least one candidate vocabulary to the user, determining whether the user selects a candidate vocabulary from the at least one candidate vocabulary, and in response to determining that the user selects the candidate vocabulary from the at least one candidate vocabulary, using the selected candidate vocabulary as the second vocabulary.

According to one or more embodiments of the present disclosure, in the interactive machine translation method, the step in which the second vocabulary for replacing the first vocabulary is acquired includes: receiving the second vocabulary input by the user for replacing the first vocabulary.

According to one or more embodiments of the present disclosure, in the interactive machine translation method, the step in which the source statement is translated into the first target statement includes: translating the source statement into the first target statement by using a translation model, and the step in which the at least one candidate vocabulary for replacing the first vocabulary is determined includes: determining a position of the first vocabulary in the first target statement, and acquiring, based on the position, the at least one candidate vocabulary from an intermediate result of the translation model.

According to one or more embodiments of the present disclosure, in the interactive machine translation method, the step in which the vocabulary sequence located in the front of the first vocabulary and the vocabulary sequence located behind the first vocabulary in the first target statement are adjusted based on the second vocabulary to generate the second target statement includes: adjusting the vocabulary sequence located behind the first vocabulary as a first vocabulary sequence based on the second vocabulary, adjusting the vocabulary sequence located in the front of the first vocabulary as a second vocabulary sequence based on the second vocabulary and the first vocabulary sequence, and generating the second target statement based on the second vocabulary sequence and the first vocabulary sequence.

According to one or more embodiments of the present disclosure, in the interactive machine translation method, after the second target statement is generated, the method further includes: determining whether the user adjusts a third vocabulary in the second target statement, and in response to determining that the user adjusts the third vocabulary in the second target statement, acquiring a fourth vocabulary for replacing the third vocabulary, and adjusting, based on the fourth vocabulary, a vocabulary sequence located in the front of the fourth vocabulary and a vocabulary sequence located behind the fourth vocabulary in the second target statement while maintaining the second vocabulary unchanged.

According to one or more embodiments of the present disclosure, the interactive machine translation method further includes: recording the first vocabulary and the second vocabulary in a modification history, where the modification history is used for determining a modification intention of the user to determine whether to adjust a target statement following the second target statement according to the modification intention.

According to one or more embodiments of the present disclosure, in the interactive machine translation method, the step in which the target statement following the second target statement is adjusted according to the modification intention includes: determining, according to the modification intention, a recommended adjustment vocabulary and a recommended correction vocabulary of a to-be-adjusted target statement, displaying the recommended correction vocabulary at a position adjacent to the recommended adjustment vocabulary to the user for selecting, and if the user selects the recommended correction vocabulary, replacing the recommended adjustment vocabulary with the recommended correction vocabulary, updating a replacement result into a translation model that re-determines a vocabulary sequence located in front of the recommended correction vocabulary and a vocabulary sequence located behind the recommended correction vocabulary based on the replacement result to obtain a fifth target statement, and displaying the fifth target statement to the user for browsing.

According to one or more embodiments of the present disclosure, in the interactive machine translation method, the step in which the source statement is translated into the first target statement includes: translating the source statement into the first target statement by using a pre-trained model, and the method further includes: updating the model by using the source statement and the second target statement.

According to one or more embodiments of the present disclosure, in the interactive machine translation apparatus, the adjustment determination unit is configured to determine whether the user performs a selection operation on the first vocabulary, and in response to determining that the user performs the selection operation on the first vocabulary, determine that the user adjusts the first vocabulary.

According to one or more embodiments of the present disclosure, in the interactive machine translation apparatus, the adjustment determination unit is configured to: determine at least one candidate vocabulary for replacing the first vocabulary, display the at least one candidate vocabulary to the user, determine whether the user selects a candidate vocabulary from the at least one candidate vocabulary, and in response to determining that the user selects the candidate vocabulary from the at least one candidate vocabulary, use the selected candidate vocabulary as the second vocabulary.

According to one or more embodiments of the present disclosure, in the interactive machine translation apparatus, the adjustment determination unit is configured to receive the second vocabulary input by the user for replacing the first vocabulary.

According to one or more embodiments of the present disclosure, in the interactive machine translation apparatus, the statement translation unit is configured to translate the source statement into the first target statement by using a translation model, and the adjustment response unit is further configured to determine a position of the first vocabulary in the first target statement, and based on the position, acquire the at least one candidate vocabulary from an intermediate result of the translation model.

According to one or more embodiments of the present disclosure, in the interactive machine translation apparatus, the adjustment response unit is configured to adjust the vocabulary sequence located behind the first vocabulary as a first vocabulary sequence based on the second vocabulary, adjust the vocabulary sequence located in the front of the first vocabulary as a second vocabulary sequence based on the second vocabulary and the first vocabulary sequence, and generate the second target statement based on the second vocabulary sequence and the first vocabulary sequence.

According to one or more embodiments of the present disclosure, the interactive machine translation apparatus further includes a second adjustment determination unit and a second adjustment response unit. The second adjustment determination unit is configured to determine whether the user adjusts a third vocabulary in the second target statement after the second target statement is generated. The second adjustment response unit is configured to, in response to determining that the user adjusts the third vocabulary in the second target statement, acquire a fourth vocabulary for replacing the third vocabulary, and based on the fourth vocabulary, adjust a vocabulary sequence located in the front of the fourth vocabulary and a vocabulary sequence located behind the fourth vocabulary in the second target statement while maintaining the second vocabulary unchanged.

According to one or more embodiments of the present disclosure, the interactive machine translation apparatus further includes an adjustment record unit, which is configured to record the first vocabulary and the second vocabulary in a modification history, where the modification history is used for determining a modification intention of the user to determine whether to adjust a target statement following the second target statement according to the modification intention.

According to one or more embodiments of the present disclosure, in the interactive machine translation apparatus, the adjustment record unit is configured to determine a recommended adjustment vocabulary and a recommended correction vocabulary of a to-be-adjusted target statement according to the modification intention, display the recommended correction vocabulary at a position adjacent to the recommended adjustment vocabulary to the user for selecting, replace the recommended adjustment vocabulary with the recommended correction vocabulary if the user selects the recommended correction vocabulary, update a replacement result into a translation model that re-determines a vocabulary sequence located in front of the recommended correction vocabulary and a vocabulary sequence located behind the recommended correction vocabulary based on the replacement result to obtain a fifth target statement, and display the fifth target statement to the user for browsing.

According to one or more embodiments of the present disclosure, in the interactive machine translation apparatus, the statement translation unit is configured to translate the source statement into the first target statement by using a pre-trained model, and the apparatus further includes a model updating unit, which is configured to update the model by using the source statement and the second target statement.

The above description is only illustrative of embodiments of the present disclosure and the technical principles used therein. Those skilled in the art should understand that the disclosure scope involved in the embodiments of the present disclosure is not limited to the schemes formed by the particular combinations of the features described above, and is also intended to cover other schemes which may be formed by any combination of the features described above or their equivalents without departing from the concept of the present disclosure. For example, the latter solutions may be solutions formed by mutual substitutions between the features described above and the features disclosed (but not limited to) in the embodiments of the present disclosure that have similar functions.

What is claimed is:

1. An interactive machine translation method, applied to an electronic device, comprising:
   receiving, using a graphical user interface, a source statement input by a user;
   translating, using a translation model, the source statement into a first target statement, and displaying, using the graphical user interface, the first target statement;
   determining whether the user performs a selection operation on a first vocabulary in the first target statement displayed using the graphical user interface;
   in response to determining that the user performs the selection operation on the first vocabulary in the first target statement displayed using the graphical user interface, determining that the user adjusts the first vocabulary in the first target statement;

acquiring, from an intermediate result of the translation model which is generated in a process of translating the source statement into the first target statement, a second vocabulary for replacing the first vocabulary, or receiving, using the graphical user interface, a second vocabulary input by the user for replacing the first vocabulary; and adjusting, using the translation model, a vocabulary sequence located in the front of the first vocabulary and a vocabulary sequence located behind the first vocabulary in the first target statement based on the second vocabulary to generate a second target statement;

wherein the translation model is a neural network-based model;

wherein adjusting, using the translation model, the vocabulary sequence located in the front of the first vocabulary and the vocabulary sequence located behind the first vocabulary in the first target statement based on the second vocabulary to generate the second target statement comprises:

adjusting, using the translation model, the vocabulary sequence located behind the first vocabulary as a first vocabulary sequence based on the vocabulary sequence located in the front of the first vocabulary in the first target statement and the second vocabulary;

adjusting, using the translation model, the vocabulary sequence located in the front of the first vocabulary as a second vocabulary sequence based on the second vocabulary and the first vocabulary sequence; and generating the second target statement based on the second vocabulary sequence and the first vocabulary sequence.

2. The method of claim 1, wherein acquiring, from the intermediate result of the translation model, the second vocabulary for replacing the first vocabulary comprises:

determining a position of the first vocabulary in the first target statement;

acquiring, from the intermediate result of the translation model, at least one candidate vocabulary for replacing the first vocabulary based on the position;

displaying, using the graphical user interface, the at least one candidate vocabulary to the user;

determining whether the user selects a candidate vocabulary from the at least one candidate vocabulary displayed using the graphical user interface; and in response to determining that the user selects the candidate vocabulary from the at least one candidate vocabulary, using the selected candidate vocabulary as the second vocabulary.

3. The method of claim 1, after generating the second target statement, further comprising:

determining whether the user adjusts a third vocabulary in the second target statement; and in response to determining that the user adjusts the third vocabulary in the second target statement, acquiring a fourth vocabulary for replacing the third vocabulary, and adjusting, based on the fourth vocabulary, a vocabulary sequence located in the front of the fourth vocabulary and a vocabulary sequence located behind the fourth vocabulary in the second target statement, while maintaining the second vocabulary unchanged.

4. The method of claim 1, further comprising:

recording the first vocabulary and the second vocabulary in a modification history, wherein the modification history is used for determining a modification intention of the user to determine whether to adjust a target statement following the second target statement according to the modification intention.

5. The method of claim 4, wherein adjusting the target statement following the second target statement according to the modification intention comprises:

determining, according to the modification intention, a recommended adjustment vocabulary and a recommended correction vocabulary of a to-be-adjusted target statement, and displaying the recommended correction vocabulary at a position adjacent to the recommended adjustment vocabulary to the user for selecting; and in a case where the user selects the recommended correction vocabulary, adjusting, based on the recommended correction vocabulary, a vocabulary sequence located in front of the recommended correction vocabulary and a vocabulary sequence located behind the recommended correction vocabulary to obtain a fifth target statement.

6. The method of claim 1, wherein translating the source statement into the first target statement by using the translation model comprises: translating the source statement into the first target statement by using a pre-trained model; and wherein the method further comprises: updating the model by using the source statement and the second target statement.

7. An electronic device, comprising:

at least one processor, and a memory, which is configured to store an executable instruction which, when executed by the at least one processor, causes the electronic device to perform:

receiving, using a graphical user interface, a source statement input by a user;

translating, using a translation model the source statement into a first target statement, and displaying, using the graphical user interface, the first target statement;

determining whether the user performs a selection operation on a first vocabulary in the first target statement displayed using the graphical user interface;

in response to determining that the user performs the selection operation on the first vocabulary in the first target statement displayed using the graphical user interface, determining that the user adjusts the first vocabulary in the first target statement;

acquiring, from an intermediate result of the translation model which is generated in a process of translating the source statement into the first target statement, a second vocabulary for replacing the first vocabulary or receiving, using the graphical user interface, a second vocabulary input by the user for replacing the first vocabulary; and adjusting, using the translation model, a vocabulary sequence located in the front of the first vocabulary and a vocabulary sequence located behind the first vocabulary in the first target statement based on the second vocabulary to generate a second target statement;

wherein the translation model is a neural network-based model;

wherein adjusting, using the translation model, the vocabulary sequence located in the front of the first vocabulary and the vocabulary sequence located behind the first vocabulary in the first target statement based on the second vocabulary to generate the second target statement comprises:
- adjusting, using the translation model, the vocabulary sequence located behind the first vocabulary as a first vocabulary sequence based on the vocabulary sequence located in the front of the first vocabulary in the first target statement and the second vocabulary through the translation model;
- adjusting, using the translation model, the vocabulary sequence located in the front of the first vocabulary as a second vocabulary sequence based on the second vocabulary and the first vocabulary sequence; and
- generating the second target statement based on the second vocabulary sequence and the first vocabulary sequence.

8. The electronic device of claim 7, wherein acquiring the second vocabulary for replacing the first vocabulary from the intermediate result of the translation model comprises:
- determining a position of the first vocabulary in the first target statement;
- acquiring, from the intermediate result of the translation model, at least one candidate vocabulary for replacing the first vocabulary based on the position;
- displaying, using the graphical user interface the at least one candidate vocabulary to the user;
- determining whether the user selects a candidate vocabulary from the at least one candidate vocabulary displayed using the graphical user interface; and
- in response to determining that the user selects the candidate vocabulary from the at least one candidate vocabulary, using the selected candidate vocabulary as the second vocabulary.

9. The electronic device of claim 7, after generating the second target statement, further performing:
- determining whether the user adjusts a third vocabulary in the second target statement; and
- in response to determining that the user adjusts the third vocabulary in the second target statement, acquiring a fourth vocabulary for replacing the third vocabulary, and
- adjusting, based on the fourth vocabulary, a vocabulary sequence located in the front of the fourth vocabulary and a vocabulary sequence located behind the fourth vocabulary in the second target statement, while maintaining the second vocabulary unchanged.

10. The electronic device of claim 7, further performing:
- recording the first vocabulary and the second vocabulary in a modification history, wherein the modification history is used for determining a modification intention of the user to determine whether to adjust a target statement following the second target statement according to the modification intention.

11. The electronic device of claim 10, wherein adjusting the target statement following the second target statement according to the modification intention comprises:
- determining, according to the modification intention, a recommended adjustment vocabulary and a recommended correction vocabulary of a to-be-adjusted target statement, and displaying the recommended correction vocabulary at a position adjacent to the recommended adjustment vocabulary to the user for selecting; and
- in a case where the user selects the recommended correction vocabulary, adjusting, based on the recommended correction vocabulary, a vocabulary sequence located in front of the recommended correction vocabulary and a vocabulary sequence located behind the recommended correction vocabulary to obtain a fifth target statement.

12. A non-transitory computer-readable storage medium storing a computer program, wherein the computer program, when executed by a processor, performs:
- receiving, using a graphical user interface, a source statement input by a user;
- translating, using a translation model, the source statement into a first target statement, and displaying, using the graphical user interface, the first target statement;
- determining whether the user performs a selection operation on a first vocabulary in the first target statement displayed using the graphical user interface;
- in response to determining that the user performs the selection operation on the first vocabulary in the first target statement displayed using the graphical user interface, determining that the user adjusts the first vocabulary in the first target statement;
- acquiring, from an intermediate result of the translation model which is generated in a process of translating the source statement into the first target statement, a second vocabulary for replacing the first vocabulary or receiving, using the graphical user interface, a second vocabulary input by the user for replacing the first vocabulary; and
- adjusting, using the translation model, a vocabulary sequence located in the front of the first vocabulary and a vocabulary sequence located behind the first vocabulary in the first target statement based on the second vocabulary to generate a second target statement;
- wherein the translation model is a neural network-based model;
- wherein adjusting, using the translation model, the vocabulary sequence located in the front of the first vocabulary and the vocabulary sequence located behind the first vocabulary in the first target statement based on the second vocabulary to generate the second target statement comprises:
  - adjusting, using the translation model, the vocabulary sequence located behind the first vocabulary as a first vocabulary sequence based on the vocabulary sequence located in the front of the first vocabulary in the first target statement and the second vocabulary;
  - adjusting, using the translation model, the vocabulary sequence located in the front of the first vocabulary as a second vocabulary sequence based on the second vocabulary and the first vocabulary sequence; and
  - generating the second target statement based on the second vocabulary sequence and the first vocabulary sequence.

* * * * *